Dec. 6, 1927.

W. H. DONALD 1,652,132

CHOPPING AND SLICING MACHINE

Filed Nov. 26, 1926

Inventor
William H. Donald
By Clarence Perdew
Attorney.

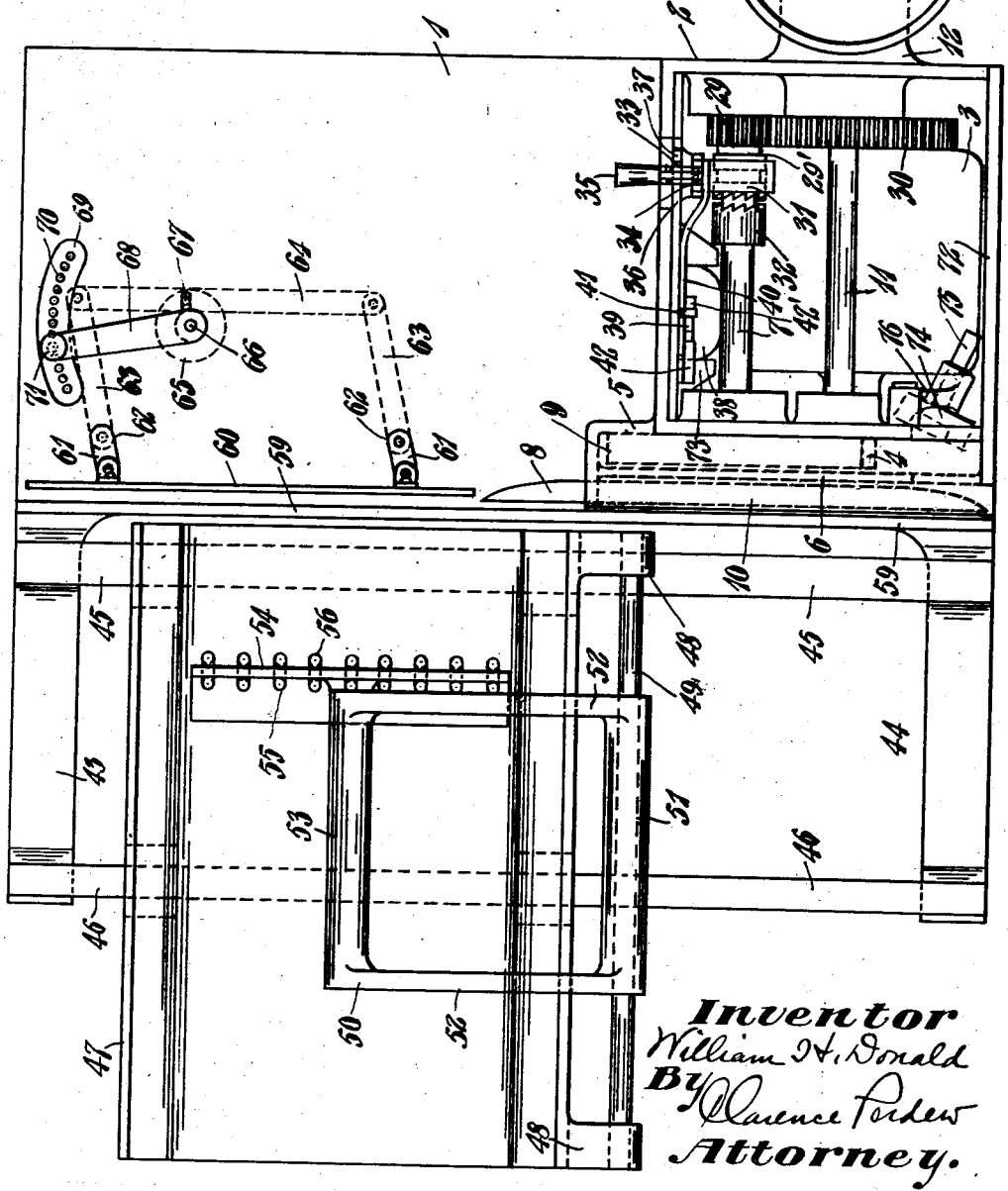

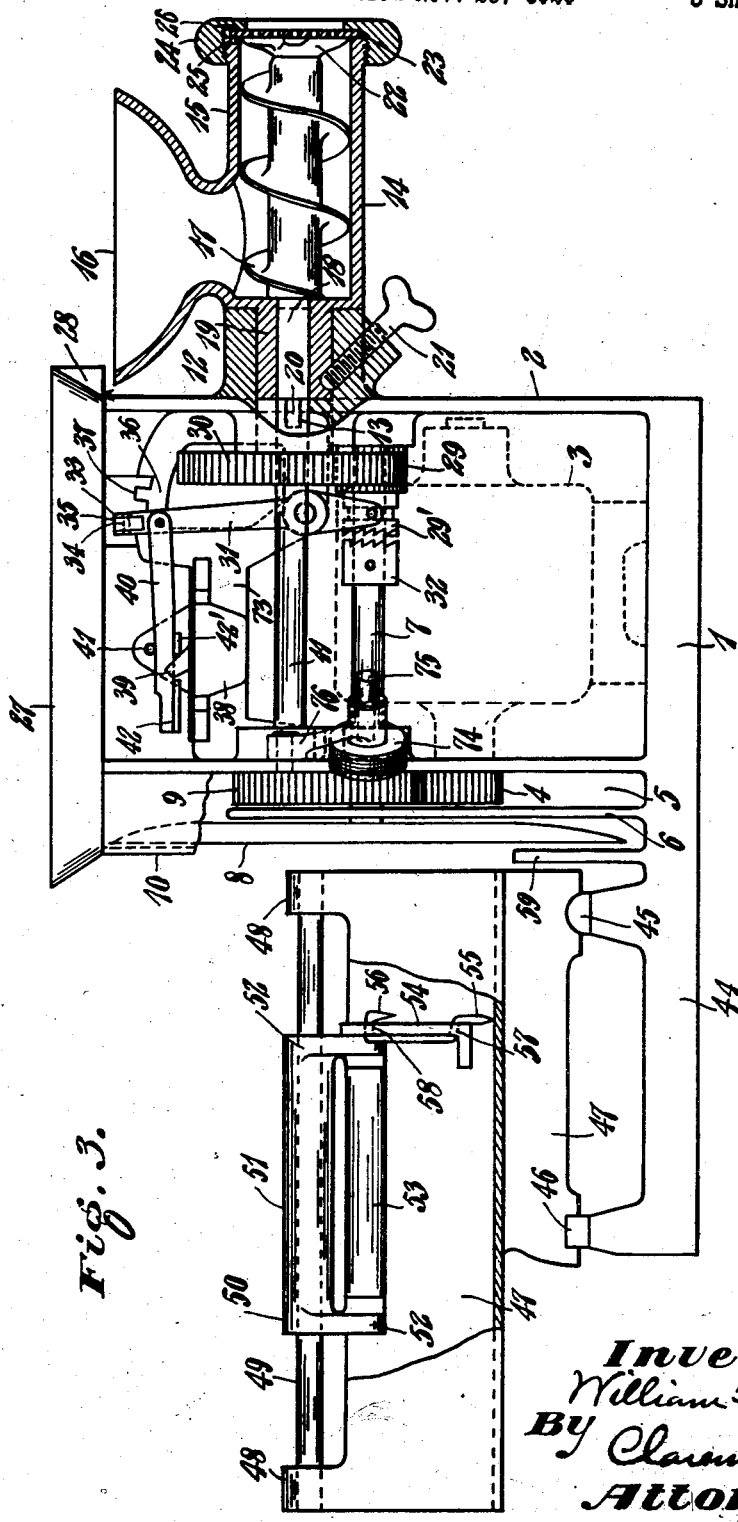

Patented Dec. 6, 1927.

1,652,132

UNITED STATES PATENT OFFICE.

WILLIAM H. DONALD, OF CINCINNATI, OHIO, ASSIGNOR OF ONE-HALF TO FREDERICK A. KNOWLES, OF CINCINNATI, OHIO.

CHOPPING AND SLICING MACHINE.

Application filed November 26, 1926. Serial No. 150,804.

My invention relates to machines for cutting meats and the like, and its object is to provide a simple, compact combination of a slicing device and a chopping device, available for the use of small meat stores and the like, where the counter space is limited, the individual sales relatively small, and the investment warranted for a machine for such purposes is to be kept as low as possible. More specific objects are, to provide for quick mounting of the article to be sliced, quick adjustment of the thickness of the slice, and ready connection of the chopping means for operation by electric power without the need of special care by the operator to avoid damage to the electric motor by overloading, so that a relatively small motor may be employed for the chopping, or the slicing, or for both chopping and slicing simultaneously. Other objects will appear in the course of the following description.

I attain these objects by the device illustrated, for example, in the accompanying drawings, in which—

Fig. 2 is a plan view of the same; and

Fig. 3 is an end elevation of the same, certain parts of the device being represented as broken away or omitted, to reveal certain interior parts, and the motor being represented by dotted lines only, for the same reason.

Figure 1:
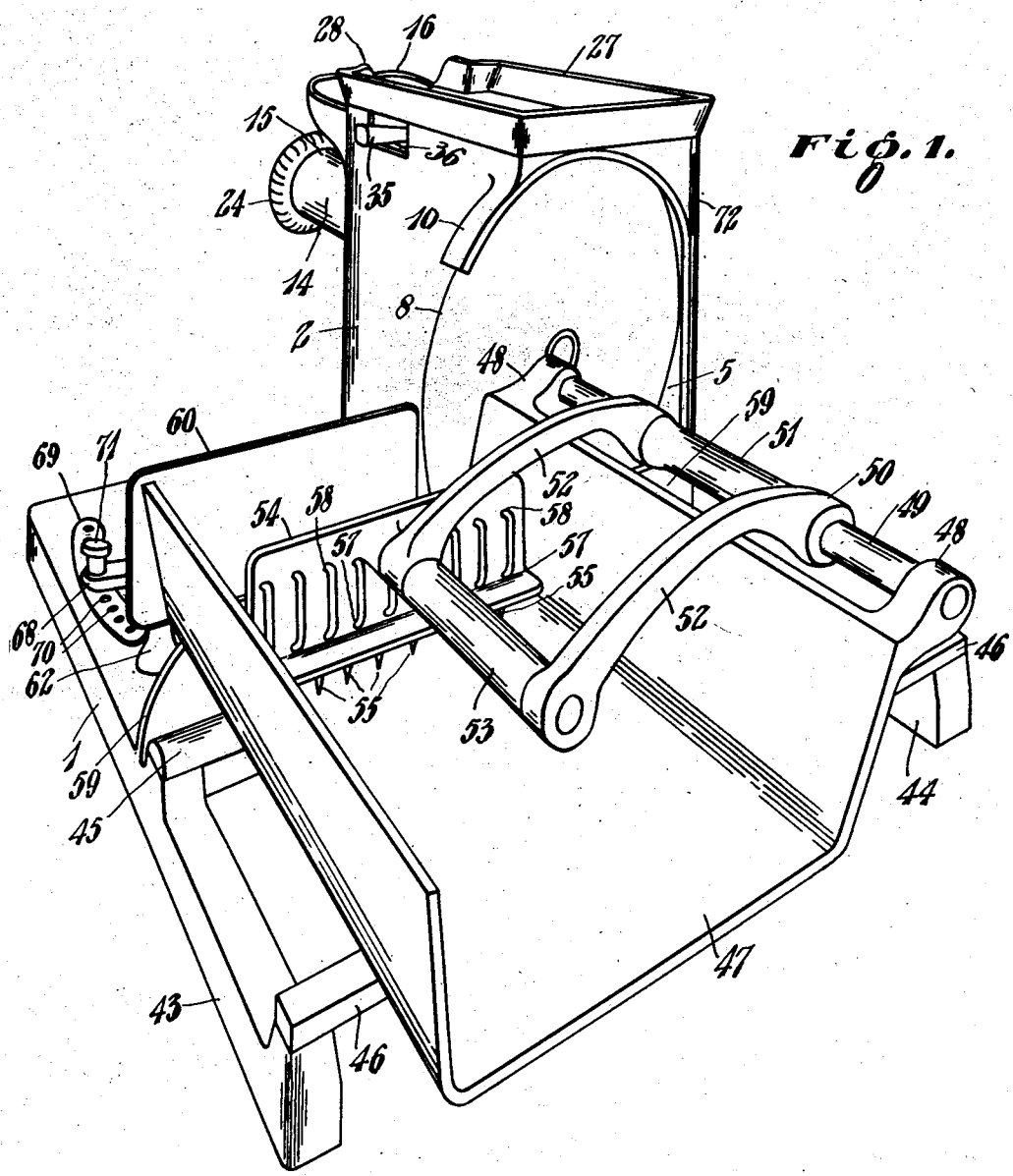
Fig. 1 is a general perspective view of the device.

A flat base 1 has at one corner an upstanding box-like casing 2, in the bottom of which is mounted the motor 3, which has its shaft extended through one wall of the casing to carry the pinion 4 in a housing 5 formed by this wall and an additional wall 6 upstanding from the base 1. The slicing-knife shaft 7 is journaled in the casing walls parallel with the motor shaft, extending out through the additional wall 6 to carry the circular knife or cutter 8 outside this wall; and within the housing 5 has fixed on it the gear 9 meshing with the motor shaft pinion 4. A suitable guard 10 partly surrounds the sharp periphery of the cutter 8, as an extension of the casing walls and the additional or housing wall 6.

A third shaft 11 is journaled in the casing walls, parallel with the motor shaft and the shaft 7, and the casing wall opposite to that side on which the circular slicing knife is located has a boss 12 with a socket concentric with this third shaft 11, in which the end of this shaft is exposed; this shaft end having a diametrical slot 13 (Fig. 3). The chopper 14 is of a well known design, comprising a casing 15 with a hopper 16 at its top, opening down to a feed screw 17 on a horizontal axis with a shaft extension 18 journaled in a hub 19 at one end of the casing; which hub 19 fits snugly in the socket of the boss 12, whereupon a flat bit 20 on the end of this shaft extension 18 fits snugly in the slot 13 of the shaft 11. A set screw 21 in the bottom of the boss 12 is screwed inward to engage in a recess in the bottom of the hub 19, thus holding the chopper 14 upon the casing 2 with its shaft extension 18 operatively connected with the shaft 11. At the opposite end of the chopper casing 15 the feed screw 17 carries the coaxial cutter 22 with radial blades rotating against the inner surface of a perforated plate 23 which is clamped in the end of the casing by a collar 24 screwed on the casing, while a pin 25 in the casing end, engaging in a notch 26 in the edge of the plate 23 prevents this plate from rotating. As is well known in the art, the screw 17 feeds portions of meat or the like, coming down from the hopper 16, to the cutter 22, which, coacting with the edges of the perforations in the plate 23, cuts the portions into small particles which are forced out through the perforations; and plates with perforations of different sizes may be mounted in the chopper, causing the meat or the like to be chopped into more or less finely divided particles. A tray 27 forms a top or cover for the main casing 2 and the housing 5, and has a spout 28 discharging into the hopper 16 of the chopper 14.

The shaft 7 has loosely mounted on it a pinion 29 which meshes with a gear 30 fixed on the shaft 11 that drives the chopper 14. This pinion 29 has fast to it a clutch member 29' which is shifted by a lever 31 fulcrumed on the wall of the casing 2 to engage with a clutch member 32 pinned on the shaft 7, the pinion 29 sliding therewith. This lever has at its upper end a horizontal extension 33, inwardly of the casing 2, which has near its inner end a fulcrum 34 for the handle 35 that extends outside the casing 2 through a recess in the upper edge of the casing wall, across a segment 36 disposed along the bottom of the recess and having an upstanding lug 37 close to its end nearest the chopper 14. When this lever 32 is swung to this end of the segment the handle 35 is dropped between this lug 37 and the adjacent end of the recess; and it is in this position that the lever holds the clutch 29' in engagement so that the slicing-knife shaft 7 drives the chopper 14, through the medium of the pinion 29, gear 30 and shaft 11. In Fig. 3 these parts are shown out of this position, so that the motor 3 would drive the slicing knife 8 but not the chopper 14.

The motor 3 is started or stopped by means of the switch 38 having the upwardly extended lever 39 which, swung to the left in Fig. 3, as shown, stops the motor. The bar 40, with one end pivoted to the upper part of the clutch lever 31 and its other end sliding under the pin 41, which is fixed just above the switch lever 39, has inward extensions 42 and 42' where it extends over the switch casing alongside the lever 39 of the switch, engaging this lever as the bar is shifted one way or the other along with the clutch lever 31. As this clutch lever 31 is swung to the right from the position shown in Fig. 3, the bar 40 first, by engagement of its left hand lug or extension 42 with the switch lever 39, throws this lever to the right, starting the motor 3, before the clutch lever 31 has swung far enough to engage the clutch members 29' and 32 together. If only the slicing knife 8 is to be operated the clutch lever 31 is not thrown further to the right; but if the chopper 14 is to be operated also, the lever 31 is thrown completely to the right, causing the clutch members 29' and 32 to engage together during this last stage of the swinging, during which the bar 40 slips from under the pin 41 up off of the switch lever 39.

By this combination of the clutch-operating means and the switch-operating means, it always will be assured that the motor 3 will be running, driving the cutter 8, with the momentum of this cutter, before the chopper 14 is connected; avoiding overloading of the motor at starting, as would occur were the chopper, with material therein, connected while starting the motor. Driving the chopper 14 from the shaft carrying the relatively heavy slicing cutter 8, with the latter acting as a fly wheel for the chopper, and having this preventative against overload of the motor in starting, permits a relatively small motor to be used; or, as compared with merely a chopping machine driven by a motor and having a fly wheel, the slicing cutter 8 serves the purpose of such fly wheel and at the same time is available for slicing, in conjunction with other parts of the apparatus now to be described.

The base 1 has at its ends, extending out from the side where the slicing cutter 8 is located, foot extensions 43 and 44, which support the respective ends of rails 45 and 46 parallel with the cutting plane of the cutter 8; and on these rails slides the carrier 47, which is a trough shaped body with feet straddling the rails and one open end of the trough toward the cutter 8 so that a piece of meat or the like, resting therein, may be slid across the cutting plane and then, with the carrier, along the rails, so that the rotating cutter 8 cuts a slice therefrom.

This carrier 47 has on its side that is foremost in cutting direction lugs 48 at opposite ends, in which is fixed a rod 49 extending from one lug to the other; and a frame 50 comprises a barrel 51 embracing this rod 49, arms 52 extending in across the interior of the carrier 47, and a handle member 53 extending between the inner ends of these arms. The width of this frame, or length of its barrel 51, is sufficiently less than the extent of the rod 49 to allow a considerable degree of sliding of this frame toward or away from the cutter 8. At the end of the handle member 53 nearer the cutter the holder member 54, of L-shaped cross-section, has an upright member of this cross-section pivoted, about midway of the length of the holder member, to the frame 50, with the horizontal member projected under the frame, away from the cutter 8. This holder member is provided with a series of teeth or prongs 55 projecting down from its bottom, and another series of teeth or prongs 56 projecting down along its surface that is presented toward the cutter 8. As long as the piece of meat or the like has ample length, it is held by the lower set of prongs 55, which are inserted in it by swinging the frame 50 down and the holder therewith; and the side prongs 56 are used when the piece, after continued slicing, has become too short to be held by the lower prongs 55 and is pushed up to this side of the holder member as it swings down, with the side prongs entering the piece and holding it on the side of the holder member. As herein shown, wires, each with both ends pointed, are bent into staple shape and inserted from the back through holes 57 and 58 in the upright part of the holder member 54, out through the front or side nearer the cutter 8, after which the pointed end parts are bent down, so that each wire forms one lower prong 55 and one upper prong 56. As herein shown, there are nine of these wires, forming as many sets of prongs 55 and 56.

That part of the base 1 not occupied by the casing 2 forms a slab onto which drops the slices of meat or the like cut by the cutter from the piece held in the carrier, as just described, and preferably, to keep these slices from getting off this slab under the carrier 47, there is an upstanding fence member 59 formed on the base, from end to end thereof, along the edge next to the carrier and extending close along the rotary cutter 8 between that and the carrier. To gauge the thickness of the slices, a gauge plate 60 is hung pivotally on short arms 61 at the upper ends of posts 62 near respective ends of the plate 60; so that as these posts 62 and their arms 61 are oscillated the gauge plate 60 is swung closer to or farther from the cutting plane, accordingly as a thinner or thicker slice is desired. The base 1 is hollow on its lower side, and these posts 62, journaled in the top of the base, extend down therethrough and have arms 63 fixed on their lower ends, extending in opposite direction from their upper arms 61, with their outer ends pivoted to respective ends of a bar 64, in the hollow lower part of the base 1. A disk 65, in this lower part of the base between the bar 64 and the top of the base, has a short shaft 66 up through the top of the base and has a pin 67 eccentrically located therein and engaging in a slot in the bar 64, so that oscillation of this disk oscillates the bar 64 and the posts 62 connected therewith as above described, which thus effect adjustment of the gauge plate 60 as described. On the upper end of the disk shaft 66, above the top of the base 1, an arm 68 is fixed, projecting over a sector plate 69 on the top of the base 1 concentric with the disk 65. This sector plate 69 has a series of holes 70, and the arm 68 has a detent 71 sliding up and down through its free end part to enter any one of these holes 70 over which the arm is swung; thus holding the gauge plate 60 in any one of a large number of adjustments for cutting as many different thicknesses of slices.

The casing 2 preferably has its rear wall 72 removable (Fig. 2) for access to the mechanism in the casing, in addition to having its top, which is the tray 27, removable. Also, preferably, the clutch lever 31 and the switch 38, before described, are mounted on a frame piece 73 made separate from and secured to the adjacent wall of the casing 2; the upper part of this piece forming the segment 36, a lateral part forming the switch support, and a downwardly projected part forming the support for the fulcrum of the clutch lever 31, as best seen in Fig. 3. The entire design preferably is such that the base 1 and its casing 2 and the wall part 72 and tray 27, as well as the body of the carrier 47, may be made as castings, which are enameled to have smooth sanitary surfaces wherever contacted by the meat or the like being chopped or sliced. The chopper 14, being readily removable from its mounting on the casing 2, and being readily disassembled as is usual with choppers of this kind, may be readily cleaned. For sharpening the rotary slicing cutter 8, a small grinding wheel 74 is mounted on a short shaft 75 journaled in the lower end of a short link 76 at the proper angle to the cutter 8; the upper end of this link 76 being pivoted just inside the casing 2 and the shaft 75 being slidable axially in the link 76. When not in use, this grinding device swings inside the casing; but is accessible upon removal of the wall part 72, whereupon the link 76 may be swung outward and the shaft 75 may be slid over until the grinding wheel 74 rests its side face against the edge of the cutter. Then as the cutter is rotated, the wheel grinds its edge, being also rotated by this engagement; this principle of applying a grinder to a cutter being known in the art, but the mounting, for applying the grinder, or putting it away, being comparatively simple and convenient to use.

I have described the disclosed invention specifically, as is required, but it will be understood that various modifications are possible without departure from the scope and spirit of my invention, which is defined in the following claims:

1. In a machine of the character described, a rotary slicing cutter and a chopping device operatively connected together, and means whereby said cutter may be caused to slice an article, said cutter acting as a fly wheel for said chopping device.

2. In a machine of the character described, a rotary slicing cutter and a chopping device, a motor driving said rotary cutter, a switch stopping or starting said motor, means whereby said cutter and chopping device may be operatively connected together only after causing said switch to start said motor, and means whereby said cutter may be caused to slice an article, said cutter acting as a fly wheel for said chopping device.

3. In a machine of the character described, a bed, a casing near one end of said bed, a rotary slicing cutter and a chopping device on opposite sides of said casing, mechanism inside said casing whereby said cutter and said chopping device are operatively connected together, and means slidably mounted on said bed whereby said cutter may be caused to slice an article, said cutter acting as a fly wheel for said chopping device.

4. In a machine of the character described, a rotary slicing cutter and a chopping device, a clutch by which said cutter and chopping device are operatively connected together, a motor operatively connected with said slicing cutter, a switch for starting and stopping said motor, a lever to operate said clutch, and an operative connection from said lever to said switch whereby said switch is set to start said motor during a first stage of swinging of said lever, said clutch being operated to operatively connect said cutter and said chopping device by further swinging of said lever.

5. In a machine of the character described, a rotary slicing cutter and a chopping device, a clutch by which said cutter and chopping device are operatively connected together, a motor operatively connected with said cutter, a switch for starting and stopping said motor, a lever to operate said clutch, a bar connected to said lever and engaging with said switch, and means holding said bar in engagement with said switch during a first stage of swinging of said lever, to set said switch for starting said motor during said first stage of swinging, but permitting said bar to disengage from said switch upon further swinging of said lever, whereupon said lever engages said clutch together to operatively connect said chopping device with said slicing cutter.

WILLIAM H. DONALD.